US012548082B1

(12) United States Patent
Katz et al.

(10) Patent No.: US 12,548,082 B1
(45) Date of Patent: Feb. 10, 2026

(54) INTELLIGENT SYSTEMS AND METHODS FOR MOBILIZING RESOURCES AND ASSESSING VEHICLE DAMAGE USING AERIAL SENSOR DATA

(71) Applicant: UIPCO, LLC, San Antonio, TX (US)

(72) Inventors: Brian Howard Katz, San Antonio, TX (US); Surender Kumar, Palatine, IL (US); Jeffrey Thomas Cavanaugh, Sun City, AZ (US); Daniel Diaz, San Antonio, TX (US); Jennifer Holly Nance, San Antonio, TX (US); Robert Christian Law, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 156 days.

(21) Appl. No.: 18/497,705

(22) Filed: Oct. 30, 2023

Related U.S. Application Data

(60) Provisional application No. 63/381,716, filed on Oct. 31, 2022.

(51) Int. Cl.
| G06Q 40/08 | (2012.01) |
| G05D 1/00 | (2006.01) |
| G06Q 30/0645 | (2023.01) |
| G06T 7/00 | (2017.01) |
| G06V 10/70 | (2022.01) |
| G06V 20/17 | (2022.01) |

(52) U.S. Cl.
CPC ............. *G06Q 40/08* (2013.01); *G05D 1/101* (2013.01); *G06Q 30/0645* (2013.01); *G06T 7/0004* (2013.01); *G06V 10/70* (2022.01); *G06V 20/17* (2022.01); *G06T 2207/10032* (2013.01); *G06T 2207/20081* (2013.01); *G06T 2207/30252* (2013.01); *G06V 2201/08* (2022.01)

(58) Field of Classification Search
CPC ..................................................... G06Q 40/08
See application file for complete search history.

(56) References Cited

U.S. PATENT DOCUMENTS

| 10,380,694 | B1* | 8/2019 | Grant | ..................... G08G 5/32 |
| 2019/0039545 | A1* | 2/2019 | Kumar | .................. G07C 5/008 |

* cited by examiner

*Primary Examiner* — Edward Chang
(74) *Attorney, Agent, or Firm* — Plumsea Law Group, LLC

(57) ABSTRACT

A system and method for capturing and processing sensor data, such as aerial images of structures, to assess vehicular damage is disclosed. The system comprises a computing system used to obtain images of selected locations where large groups of vehicles were disposed during a natural or man-made disaster. The images are used to automatically determine a damage score for the vehicles. In addition, the imagery can be fed into a damage classifier that automatically classifies the degree of damage. The system and method may be used to quickly assess damage of vehicles in a disaster area and deploy resources to provide timely and swift assistance.

20 Claims, 8 Drawing Sheets

INTELLIGENT SYSTEMS AND METHODS FOR MOBILIZING RESOURCES AND ASSESSING VEHICLE DAMAGE USING AERIAL SENSOR DATA

CROSS-REFERENCE TO RELATED APPLICATION

This application claims the benefit of U.S. Provisional Patent Application Ser. No. 63/381,716 filed on Oct. 31, 2022 and titled "Intelligent Systems and Methods for Mobilizing Resources and Assessing Vehicle Damage Using Aerial Sensor Data", the disclosure of which is incorporated by reference herein in its entirety.

TECHNICAL FIELD

The present disclosure generally relates to structural damage assessments, and in particular to a system and method for assessing damage done to vehicles using aerial sensor data which may be visual and/or non-visual and machine learning techniques.

BACKGROUND

Following disasters such as floods, hurricanes, hailstorms, fires, and tornadoes, entities that insure properties in the disaster area may need to survey the area in order to assess any damage that has impacted one or more insured properties. In some cases, aerial sensor data may be used to assess damage. Specifically, an aerial vehicle may fly over the impacted area collecting continuous that may be used to identify generally whether property has been damaged. However, obtaining further information regarding the extent of such damage has remained a time-consuming and resource intensive task, typically requiring a human agent to visit the region in person to more closely examine the effects of the disaster. Even when such examinations are necessary, local environmental conditions following a disaster can prevent access to the impacted area for several days or weeks. This process can lead to delays for insured members in receiving much needed relief or support. The ability to quickly and accurately detect whether properties such as vehicles have been damaged and generating a rating of such damage, without the need for on-site manual inspections or other time-intensive tasks, is highly desirable.

There is a need in the art for a system and method that addresses the shortcomings discussed above.

SUMMARY

In one aspect, a method of mobilizing resources for disaster-impacted areas (e.g., based on aerial imagery) is disclosed. A first step includes receiving at a first time, at a damage assessment system, first sensor data (e.g., image sensor data visualized from one or more sensor signals) for a first region, the first sensor data including aerial views of a first group of vehicles, and a second step includes passing the first sensor data through a machine learning damage classification model of the damage assessment system. A third step includes automatically generating, at the damage classification model and based on the first sensor data, a damage report indicating a first percentage of the first group of vehicles has been damaged, and a fourth step includes automatically transmitting, from the damage assessment system and based on the damage report, a control signal to a damage response module requesting deployment of a first allocation of a first type of resource to the first region.

In another aspect, an alternate method of mobilizing resources for disaster-impacted areas is disclosed. The method can include a first step of receiving at a first time, at a damage assessment system, first sensor data for a first region, the first sensor data including aerial views of a first group of vehicles, the first group of vehicles including a first vehicle, and a second step of receiving, prior to the first time and at the damage assessment system, a first insurance claim for damage to the first vehicle. In addition, the method can include a third step of passing the first sensor data through a machine learning damage classification model of the damage assessment system, and a fourth step of generating, at the damage classification model and based on the first sensor data, a damage report indicating the first vehicle is associated with a first damage score. Furthermore, the method can include a fifth step of transmitting, from the damage assessment system and based on the damage report, a control signal to a damage response module that causes a first payout to be generated in response to the first insurance claim.

In another aspect, a system for mobilizing resources for disaster-impacted areas includes a processor and machine-readable media including instructions which, when executed by the processor, cause the processor: (1) receive at a first time, at a damage assessment system, first sensor data for a first region, the first sensor data including aerial views of a first group of vehicles; (2) pass the first sensor data through a machine learning damage classification model of the damage assessment system; (3) generate, at the damage classification model and based on the first sensor data, a damage report indicating a first percentage of the first group of vehicles has been damaged; and (4) transmit, from the damage assessment system and based on the damage report, a control signal to a damage response module requesting deployment of a first allocation of a first type of resource to the first region.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide a system and method for improving and automating the identification and inspection of damage to vehicles or other property using aerial imagery following disaster-events, such as floods, hurricanes, hailstorms, fires, tornadoes, or earthquakes. In some cases, the embodiments provide methods and systems for automating and expediting claims processing of insured residents in areas that experience disaster conditions. As will be described in greater detail below, the proposed systems and methods leverage machine learning for analyzing total loss estimations for large groups of vehicles, and to accurately determine which vehicles are damaged. This process can allow an insurer to expeditiously and intelligently mobilize resources for paying out total losses and retrieving the impacted vehicles as quickly as possible. In one example, funds can be automatically released in response to the detection of a specific type or level of damage.

In some embodiments, the system can use machine learning to identify a percent of vehicles that have significant damage within a particular area (such as a parking lot). In some embodiments, the system implements a deep learning model to estimate damages across different portions of the vehicle, as well as a machine learning model to detect potential damage to the sides of the vehicle. In one embodiment, the system can apply an artificial intelligence (AI) engine to determine approximate losses with the appropriate payouts based on each type of disaster and the degree of severity of such an event.

As one example, in response to the detection of a specific event such as a hailstorm occurring over a large airport parking lot in which hundreds of vehicles were parked, the system can initiate an aerial sensor data collection. In some cases, one or more drones could be dispatched to the target area to capture sensory data payloads which would then be used for further analysis. The analysis would use machine learning models, including in some embodiments, convolutional neural networks (CNNs) to estimate the percent of vehicles within an image that show hail damage. In different embodiments, a model would identify the type of damage as well as the extent of the damage. In another example, the model could identify the portion of the vehicle that has been damaged (e.g., the roof, trunk, hood, etc., in the case of primarily aerial or overhead imaging). In some embodiments, in addition to assessing real-time damage to vehicles, such analysis could provide a proxy for the extent of hail damage across an area.

Figure 1:
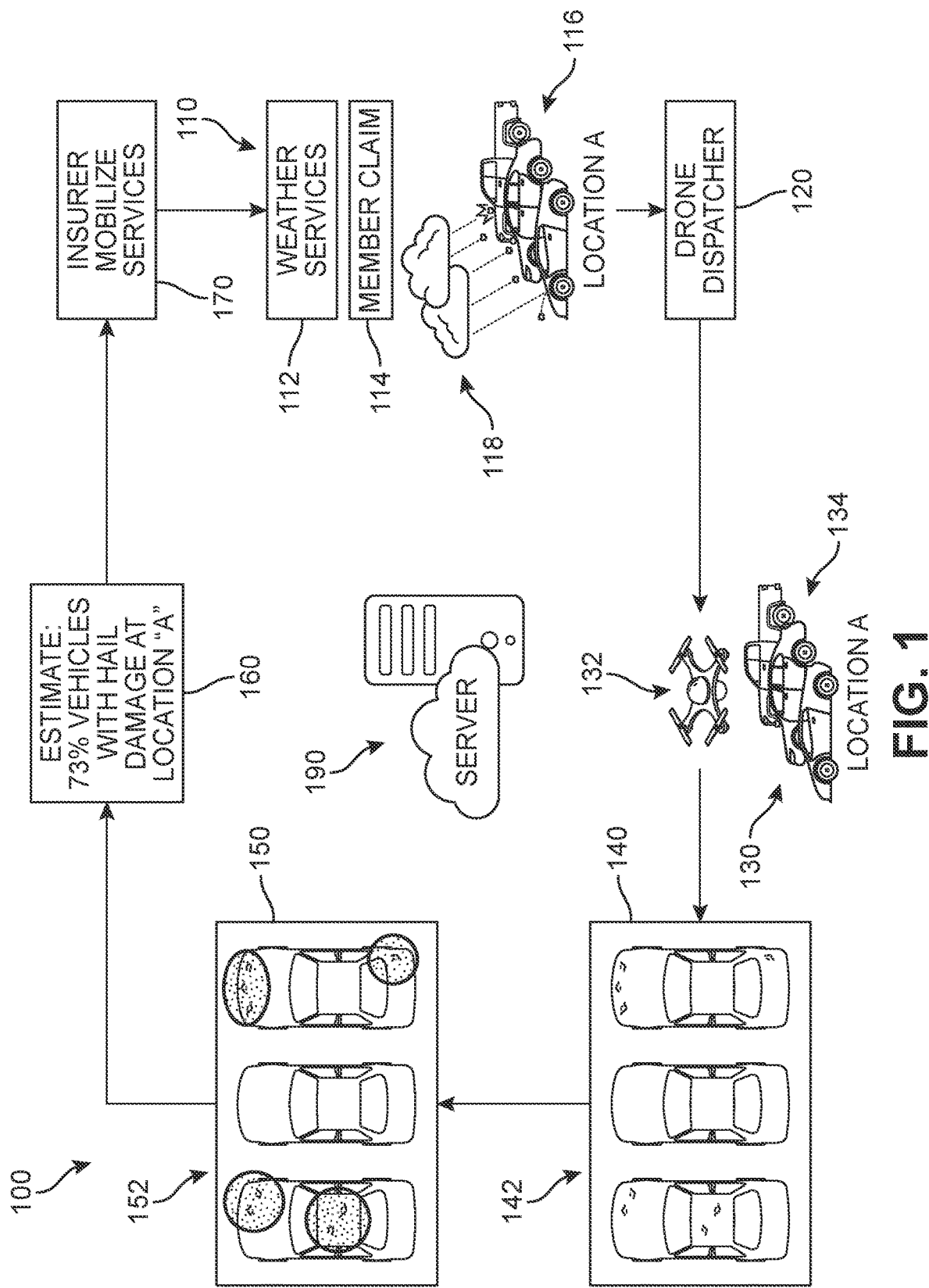
FIG. 1 is a schematic overview of a damage assessment cycle, according to an embodiment.

For purposes of clarity, an overview of one embodiment of the proposed systems and methods is illustrated with reference to FIG. 1. In FIG. 1, a flow diagram presents an embodiment of a damage response cycle ("cycle") 100 utilizing a computer-implemented loss assessment system ("system") 190. As shown in FIG. 1, in different embodiments, during a first stage 110, the system receives some data that serves as a triggering event. As will be described in greater detail below, the proposed systems can include provisions for automatically implementing an aerial image capture session in response to a determination that a triggering event has occurred. For purposes of this application, a triggering event ("trigger") refers to an event or sequence of events that matches a pre-selected condition and will cause a specific operation to be implemented, enabled, activated, implemented, and/or initiated by the system.

In FIG. 1, some example inputs are shown, including weather services 112 for a particular target site 116 (e.g., Location A) and/or a member claim 114 submitted for property (shown here as vehicles) in the target site 116. For purposes of this example, a hailstorm 118 has occurred in the target area 116. In response to this trigger, the system progresses to a second stage 120 whereby one or more aerial flyovers are initiated, such as via a drone dispatcher or controller. A drone 132 or other UAV (unmanned aerial vehicle), equipped with image sensors and other sensors (see below), arrives at the target site in a third stage 130 and performs image capture of vehicles 134 in the area. The images are transmitted as image data 142 to the system 190 in a fourth stage 140. In subsequent fifth stage 150, the system 100 processes and analyzes said image data 140 to determine both the specific areas of each vehicle that have been damaged and the extent of such damage. This assessment 150 can then be used by the system 190 to generate an estimate in a sixth stage 160, an example excerpt of which is shown in FIG. 1 as "Estimate: 73% vehicles with hail damage at Location A". Following this assessment, the system 100 can be configured to automatically assign specific types of resources to the target region and/or and allocate funds as needed to assist insured members affected by the detected loss in a seventh stage 170 ("insurer mobilize resources").

Figure 2:
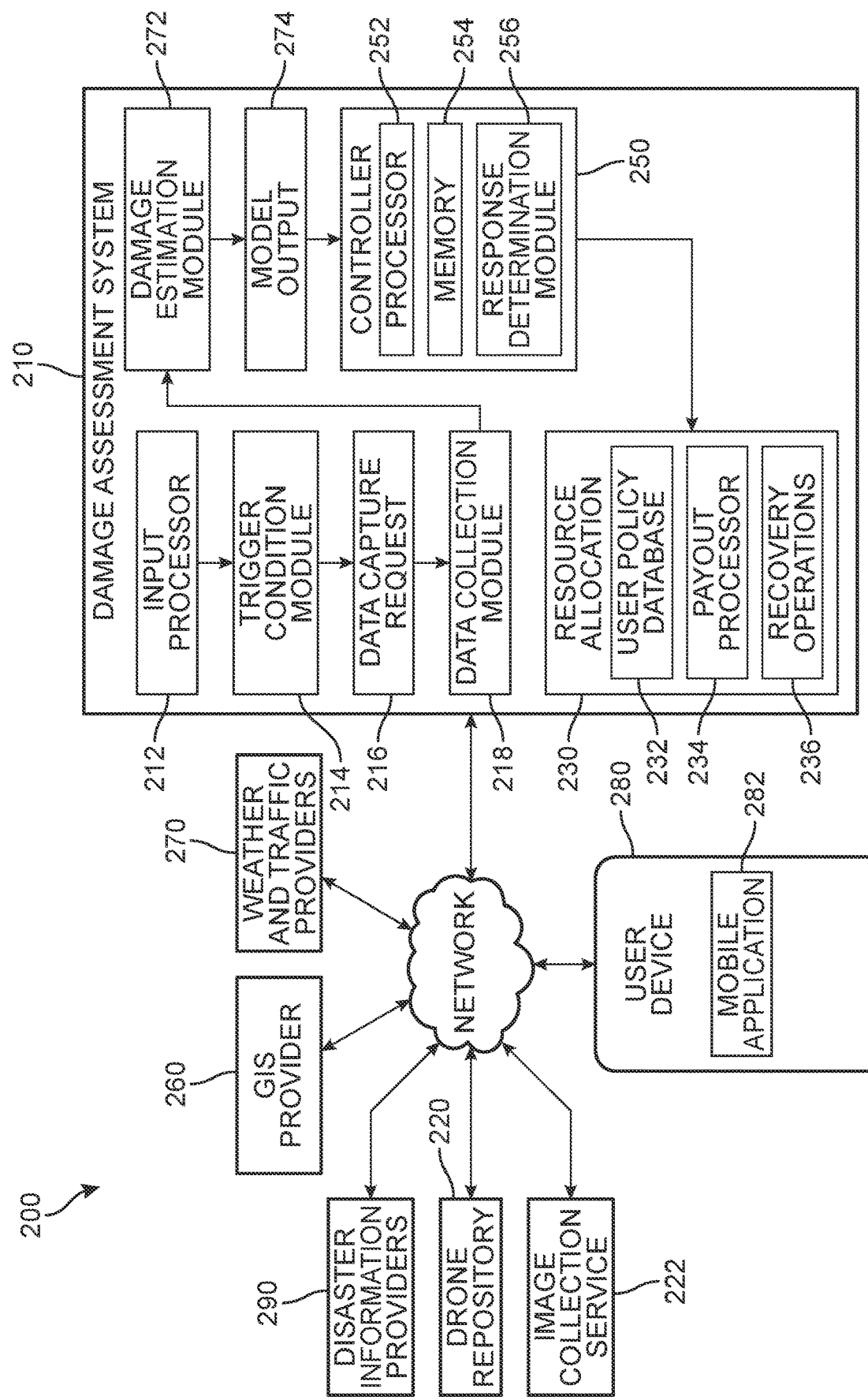
FIG. 2 is a schematic diagram depicting an environment for a damage assessment system and associated components, according to an embodiment.

Referring now to FIG. 2, a schematic diagram is shown representing the architecture of one embodiment of a damage response environment ("environment") 200 in which a damage assessment system ("system") 210 may be implemented. In general, the system 210 may be triggered on behalf of property owners or insured members for structures or vehicles or other objects located in a geographic area before, during, or following a disaster (or emergency). Disasters may include (but are not limited to) natural disasters, such as wildfires, storms, floods, tornados, hurricanes, blizzards, and earthquakes, as well as man-made disasters such as house/building fires and mass shootings.

In FIG. 2, the system 210 includes an input processor 212 for receiving various inputs that may be used to determine whether a triggering event has occurred. The inputs can be received from various sources (public and private). One such organization is The National Oceanic and Atmospheric Administration (NOAA). These inputs are then received by a trigger condition module 214 which will identify whether the input includes specific features or characteristics that warrant a follow-up image capture. For example, system 210 may communicate with various other systems, services, databases, etc. over one or more networks 240. Examples of networks that may be used to facilitate communication between different systems include, but are not limited to: Wi-Fi networks, cellular networks, local area networks (LANs), wide area networks (WANs), personal area networks (PANs), as well as any other suitable networks.

In one example, system 210 may communicate with one or more disaster information providers 290. As used herein, the term "disaster information provider" refers to any entity that may transmit information about pending or ongoing disasters. As an example, the Emergency Alert System (EAS) is a federal system used in the United States to provide emergency notifications, including emergency weather alerts for specific geographic areas. In other embodiments, disaster information providers 290 could include any other organization (private or public) configured to deliver information about pending or ongoing disasters or emergencies. Alerts can be provided over any communication mode, including short messaging service (SMS) based texts, emails, or other suitable communication modes.

In addition, in some embodiments, system 210 may also communicate with a Geographic Information System (GIS) provider 260. For example, the system 210 could retrieve maps and other related geographic information from GIS provider 260. Furthermore, system 210 may also communicate with weather and traffic providers 270, such as NOAA. Specifically, system 210 may receive real-time or near real-time information about weather and traffic in specific geographic locations. In some cases, real-time traffic information may include information about road closures or large-scale accidents or other loss-events involving vehicles in an area.

In some embodiments, system 210 may communicate with members through one or more devices. As an example, a user device ("device") 280 is shown schematically in FIG. 2. The devices may be owned by residents in a particular geographic region. In one embodiment, the device 280 may run an application 282 for communicating information between system 210 and a member. Device 280 could include computing resources such as processors, memory, and a navigation system for detecting a current GPS location. Device 280 may comprise mobile phones, desktop computers, laptops, tablets, smart watches or other computing devices. For example, device 280 could be used to log into an insurance portal to generate and submit a claim for property impacted by a particular disaster.

In different embodiments, damage assessment system 210 includes provisions for gathering information about potentially damaged property following a disaster that can be used to facilitate relief efforts and recovery of the disaster area. The system 210 may also include provisions for processing sensor data such as image data and for communicating with various other systems. For example, in different embodiments, one or more of the described external sources (e.g., GIS providers 260, weather and traffic providers 270, disaster information providers 290, member claims, etc.) can provide inputs to the system 210 that will be evaluated by trigger condition module 214 to determine whether there is sufficient basis to warrant a control signal to be sent to an data capture request module 216. The decision as to whether the input(s) individually or holistically/together warrant a trigger can vary based on the settings established by a system administrator. However, in general, a large number of claims stemming from a single disaster event or from a focused target area (e.g., a single parking lot) will be identified as a trigger. Similarly, a large-scale disaster described by the disaster information providers 290 and being confirmed by weather services can also be identified as a trigger.

It should be appreciated that the sensor data that can be collected and/or used by the systems described herein can be visual and/or non-visual. For example, data can be obtained from low-earth orbit satellite, geosynchronous satellite, gliders, drones, planes, helicopters, airborne-capable robot, balloons, blimps, sensor-carrying organic life, fixed or other aerial devices, as well as terrestrial images (e.g., autonomous ground vehicles, fixed position ground sensors, autonomous ground robotics, etc.) Thus, although the examples presented in the drawings depict image-based sensor data for purposes of simplicity, it is to be understood that the datasets are not limited to images, and can include, for example, signal and sensor data, multi-spectral, EMF, gravimetry, thermal, acoustic, magnetometric, radiometric, particle detection (PM, alpha/beta particle detection), neutron detection, gamma ray detection, gaseous species detection, ionic species detection, and other such types of data.

Thus, in different embodiments, trigger condition module 214 can receive the processed data from the input processor 212 which allows the trigger condition module 214 to determine whether the target area is associated with an environment, scenario, or other condition whereby damage has occurred to the extent that an image or other data capture request should be generated. In response to the determination of the occurrence of a triggering event, the data capture request module 216 can be configured to automatically cause a request for such data to be transmitted to the one or more sources described herein.

In one embodiment, upon receiving such a 'green-light' by the trigger condition module 214, the data capture request module 216 is configured to transmit a request to a proprietary or non-proprietary drone repository 220 and/or other associated image capture service 222 to perform a sensor data collection session for the target area or otherwise obtain data directed to the target area. In general, the drone repository 220 can include one or more drones representing a fleet of drones being stored in surveillance range of the target location as suitable to monitor and/or serve the given disaster area.

In some other embodiments, sensor data can comprise images can be obtained from a satellite-based image database, which can offer real-time data for the target location. For example, in some embodiments, data can be collected during manned or other unmanned aviation fly-bys over the target location to build a better localized and instantaneous report of near-current damage conditions. This can include raw weather data collected by some type of sensor suite including surface and airborne observations, radar, lightning, satellite imagery, and profilers. Specifically, a computing system may retrieve image information from a satellite images database. For example, the computing system could access a satellite images database over a network. In order to determine which images to use, a system may look up the address of the premises (e.g., via GIS provider 260), which may generally be stored by the provider on a database of computing system.

In some cases, real-time weather information (e.g., weather and traffic providers 270) can be obtained via Flight Information Services (FIS), which is a mechanism for disseminating meteorological (MET) and aeronautical information to displays in the cockpit in order to enhance pilot situational awareness, provide decision support tools, and improve safety. FIS augments traditional pilot voice communication with Flight Service Stations (FSSs), ATC facilities, or Airline Operations Control Centers (AOCCs). FIS can provide textual and graphical information that can be used by the module to fine-tune the recommended flight path closer to the expected time of departure. Specifically, an FAA-sponsored system referred to as FIS-B may be accessed to receive and display a suite of broadcast weather and aeronautical information products. In other cases, non-FAA FIS Systems can be used to obtain FIS data over both the aeronautical spectrum and on other frequencies using a variety of data link protocols. This information can be used by the system to determine the impact of specific weather patterns (e.g., torrential rain, hailstorms, tornados, etc.)

In some other examples, reported weather conditions applicable to likely damage in the target location can be obtained from one or more available sources, such as but not limited to METARs/SPECIs, PIREPs, RAREPs, and NOAA. In one embodiment, the system can monitor the ADS-B flight tracks (position, heading, speed, altitude) for planes flying over or near the target location and/or over a portion of the route to be taken based on the generated flight path to determine the environmental conditions. Such data sources offer real-time, highly accurate information about environmental conditions in the target location. One or more of these and other data sources can provide information that can be used as input to the damage detection module to estimate an impact on the region.

Thus, in different embodiments, a data collection module 218 can receive data in the form of a plurality of sensor data (such as aerial images) captured by satellites above the impacted region, weather, traffic, drone-based aerial images, on-the-ground images captured by members and residents, etc. The data can be used by a damage estimation module 272 to determine whether there are damage properties in a specific region ("target region" or "target site" or "target area"), and the types or patterns of damage.

In different embodiments, damage assessment system 210 may also include damage estimation module 272, which further includes a machine learning algorithm configured to detect and classify damage to vehicles and other such property. In different embodiments, damage estimation module 272 may comprise any program or algorithm that is used to classify images according to the degree and/or type of damage the vehicle has sustained. In some embodiments, damage estimation module 272 includes one or more machine learning models. In one embodiment, damage estimation module 272 could include a convolutional neural network or a recurrent neural network (RNN). In other embodiments, damage estimation module 272 could comprise any other algorithm (or set of algorithms) from the field for machine learning and/or machine vision.

In different embodiments, a machine learning model can be used by the damage estimation module 272 to determine whether there is a high likelihood of damage resulting from the natural disaster. For example, damage to portions of a roof, and/or a car hood, as well as a broken window, likely vehicle water inundation by appearance of water-line or water-line residual stain on vehicle panels/glass, and other dents which can be identified by the classifier as representing a specific type/magnitude of damage. For each loss identified, the system can be configured to further determine the extent of the damage, as well as generate a repair estimate. In some examples, 3D models can be used to determine the dimensions for various portions of the vehicle, providing such estimates with a high degree of accuracy. Furthermore, in some embodiments, the system may apply visual indicators to the areas where deviation (or damage) may have occurred or otherwise highlighting the location(s) of deviations that are suggestive of possible damage for presentation to an end-user via a dashboard user interface (e.g., see FIG. 6). Visual indicators may alert a user that further inspection of this part of the vehicle's structure is needed. In some cases, this information could be further used to deploy drones to capture further images for insurance purposes.

In addition, in some embodiments, a deep learning model can be used to estimate damages across different portions of the vehicle and/or output of a 2D "heat map" of probable damage at different portions of the vehicle. In other words, in different embodiments, aerial imagery may be analyzed to determine if a vehicle has sustained damage. For example, sensor data (such as image data) may be analyzed to determine if a car roof at a certain coordinate has indentations or bumps. In another example, image data is analyzed to determine the extent of damage that has occurred (e.g., how deep the dent appears, how large the dent is, the percentage of damage to a component (e.g., roof) of the vehicle), as well as identify which portion of the structure is damaged (e.g., roof, windows, windshield, hood, trunk, side doors, etc.).

In some embodiments, traditional visual spectrum images can be enhanced using contrast, such as black and white lines, and/or specialty lighting (illuminator) employed by the drone. In addition, the drone can include a wide range of onboard sensors (e.g., radar, sonar, FLIR) that can capture data that can be used independently or in concert with visual images. Such consolidation of data can improve the visualization of hail and hail damage in the data. Thus, in different embodiments, each drone can carry image sensors as well as multi-spectral or multi-sensor devices, which can collect data that will better train the model described herein. In some embodiments, the model can be used to identify or estimate the approximate size of hail impact (diameter), the shape of hail impacts (circular/elliptical), the number of hail impacts per vehicle panel, broken or cracked glass, and whether the vehicle interior has been exposed to the elements (snow, ice, hail, water, etc.).

In some embodiments, satellite imagery can be input to the deep learning damage detection model in order to generate bounded regions in which the detected damage is located. The high-resolution imagery is then further processed to determine centroids for the damage and the probable extent of the damage as it radiates outward from the centroid. For example, a heat map or other a data visualization technique may be generated that shows magnitude of damage assessed as color in two dimensions. The variation in color may be by hue or intensity, giving obvious visual cues about how the damage is clustered or varies over space. Such representations offer end-users a mechanism by which to visualize complex data and understand it at a glance. In other words, the system assigns different damage values or ranking and presents this information in an easily consumable format similar to infrared or heat maps, where the hue or intensity is more pronounced toward the portion of the vehicle where the damage was greatest. In another example, the pixel information from an image may be used to create a damage intensity plane that depicts an indication of intensity of damage across a selected area.

In different embodiments, the heat map may make use of image processing techniques to help determine the extent of damage, such as filtering, edge detection (e.g., Sobel operator, Prewitt operator, etc.), image hue, saturation, intensity, color, etc. thresholding, or binary image morphology. Image processing techniques to help determine damage include information associated with trained machine learning engines, image classification algorithms, multi class classification, and anomaly detection. In some embodiments, these techniques may be used to correlate particular types and levels of damage or material properties when a threshold is reached. Filtering and transform operators may enhance the image features indicative of damage. Thresholds applied to enhanced pixel values may help to classify regions of damage for detection both spatially within the image and in terms of magnitude relative between regions within an image and relative between images. This may be a learned process where determined thresholds are a function of information such as anticipated damage type, lighting, time of day the picture was taken, or the sensor that recorded the images. In different embodiments, learning (or training) may be implemented by common machine learning algorithms, such as tensor flow, support vector machine, neural networks, autoencoders, Gaussian mixture models, or Naïve Bayes models, among others.

In different embodiments, insurance or other damage-related claims may be proactively created based on the damage assessment generated by the damage estimation module 272. In another example, hyperspectral imagery is taken, utilized, and analyzed to determine information such as what kind of damage was sustained, to determine for example whether water damage was caused by salt water or fresh water. The type of water damage may be utilized to determine if an insurance claim should be characterized as flood or storm damage or the extent of damage, such as damage to carpet, wood flooring, or the like. In another example, the aerial vehicle may gather thermal imagery, which may be utilized to identify hail (or other) damage to a car's roof.

In different embodiments, damage estimation module 272 includes machine vision algorithms may be applied to identify an object in the digital image. In some embodiments, the damage estimation module 272 may include computer vision algorithms such as image analysis algorithms that may use a feature detector or a combination of detectors. For example, a texture detector and edge detector may be used. If both specific texture and specific edges are detected in a set of images, then an identification may be made. One example of an edge detection method includes the Canny™ algorithm available in computer vision libraries such as Intel™ OpenCV. Texture detectors may use known algorithms such as texture detection algorithms provided by Matlab™

In different embodiments, the input (e.g., images taken of a target area) is cleansed and normalized. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

Furthermore, damage estimation module 272 can be trained to work in conjunction with computer vision techniques to apply machine learning techniques, such as deep learning that includes classification, clustering, and/or other techniques, such as techniques that employ deep learning neural networks for pattern recognition within the sensor data, or to perform other types of analysis. For example, a neural network and/or classification technique may be used to train a model that is a classifier and that is useable to detect and rate different types and levels of damage. Some suitable artificial intelligence software is available for public access through open source AI platforms like Caffe, Torch and Theano who provide businesses access to powerful neural networks for processing of their information by AI techniques like deep learning, reinforcement learning and logistic regression, as well as TensorFlow, OpenAI, and BigSur. Moreover, in some implementations, the process may employ a damage estimation engine that uses ML techniques to generate repair and/or recovery response information. In some embodiments, such techniques may include supervised and/or unsupervised ML techniques. In some implementations, the estimation engine may employ a ML-based model that is trained using training data that includes damage estimates and identifiers. Accordingly, the estimation engine may be trained over time to develop a more accurate damage description (e.g., see FIG. 3).

It should be appreciated that in different embodiments, one or more machine learning algorithms for classifying objects in images can differ in cases where the images are satellite images versus ground-based images. This difference in appearance is a result of the different perspectives (and distances) of the ground-based and satellite-based imaging methods. It may therefore be appreciated that while similar machine learning algorithms may be used to identify damage from ground-based and satellite-based images, the algorithms may be trained differently and may converge on different learning parameters.

In different embodiments, once the system determines if a specific type of damage has been detected, it may output a damage classification parameter that corresponds to the damage type and level. For example, following processing by the damage estimation module 272, a damage assessment (model output 272) can be generated that identifies the various types of damage (e.g., fire, wind, flood, debris, hail, etc.). Some examples of the model are described in U.S. patent application Ser. No. 16/989,375 (Plumsea Ref No. 171-1327) filed on Aug. 10, 2020 to Jess W. Gingrich, et al. and titled "Intelligent System and Method for Assessing Structural Damage Using Aerial Imagery", the disclosure of which is hereby incorporated by reference in its entirety. The model output 272 can identify where individual vehicles or other objects of interest have been detected, as well as identification of the varying types and/or degree of damage to each vehicle. For example, a first type of damage (e.g., hail) may have been identified in the images, but the different vehicles in the images may present different levels of damage. In another example, multiple types of damage may be identified in the images (e.g., floodwater, hail, fire, debris). In addition, other labels or supplemental information can be added to or otherwise annotated to the data to indicate the severity of the damage.

In different embodiments, the model output 274 will be sent to a controller 250 of the system 210. Controller 250 can further include one or more processors 252 and memory 254. Memory 254 may comprise a non-transitory computer readable medium. Instructions stored within memory 254 may be executed by the one or more processors 252. In addition, the system 210 may include a communication system such as a radio or other provisions for communicating using one or more communication methods. In particular, the communication system includes provisions for communicating with other components of the environment 200 over a network.

In different embodiments, based on the decision described by the model output 274, the controller 250 can make a determination via a response determination module 256 as to the optimal response or allocation of resources that should be provided to the target area generally and/or individual vehicles or other properties located in the target area. It can be appreciated that the final recommendation of response determination module 256 can be further based on information stored in resource allocation module 230, which may be part of system 210 or an external system. Resource allocation module 230 can provide information from one or more of a user policy database 232, payout processor 234, and recovery operations 236 that will fine-tune the recommendation based on what resources are actually available at the time, what type of policy a user/member holds, whether funds have been previously sent for this event to the target area, etc.

Once the response determination module 256 generates a recommendation, the output is provided to the resource allocation module 230 for execution and/or deployment. In some embodiments, the system applies an artificial intelligence (AI) engine to determine approximate losses with the appropriate payouts based on each type of disaster and the degree of severity of such an event. In one example, the payout processor 234 will automatically cause the preauthorization of payments to certain affected areas and to members located in those areas using this information if so recommended by the response determination module 256. The funds can be automatically released in response to the recommendation outputted following the detection of a predefined emergency (as determined by the system based on the model output 274 of damage estimation module 272). In another example, specific types of recovery operations 236 can be automatically deployed to the region based on the recommendation, such as tow trucks, repair crews, and debris removal agents, or other machinery. In such cases the user policy database may also be automatically updated to indicate what actions were taken as relating to a specific member whose property is located in the target area.

In yet another example, the resource allocation module 230 can be configured to automatically generate a first notice of loss (FNOL) claim for insured property that was included in the target area damage estimate. A FNOL refers to the initial report made to an insurance provider following loss, theft, or damage of an insured asset, and is normally the first step in the formal claims process lifecycle. Thus, an automated process for generating such a report can be of great value to both the insurer and vehicle owner, as it greatly expedites the process as a whole and improves the claims experience.

Figure 3:
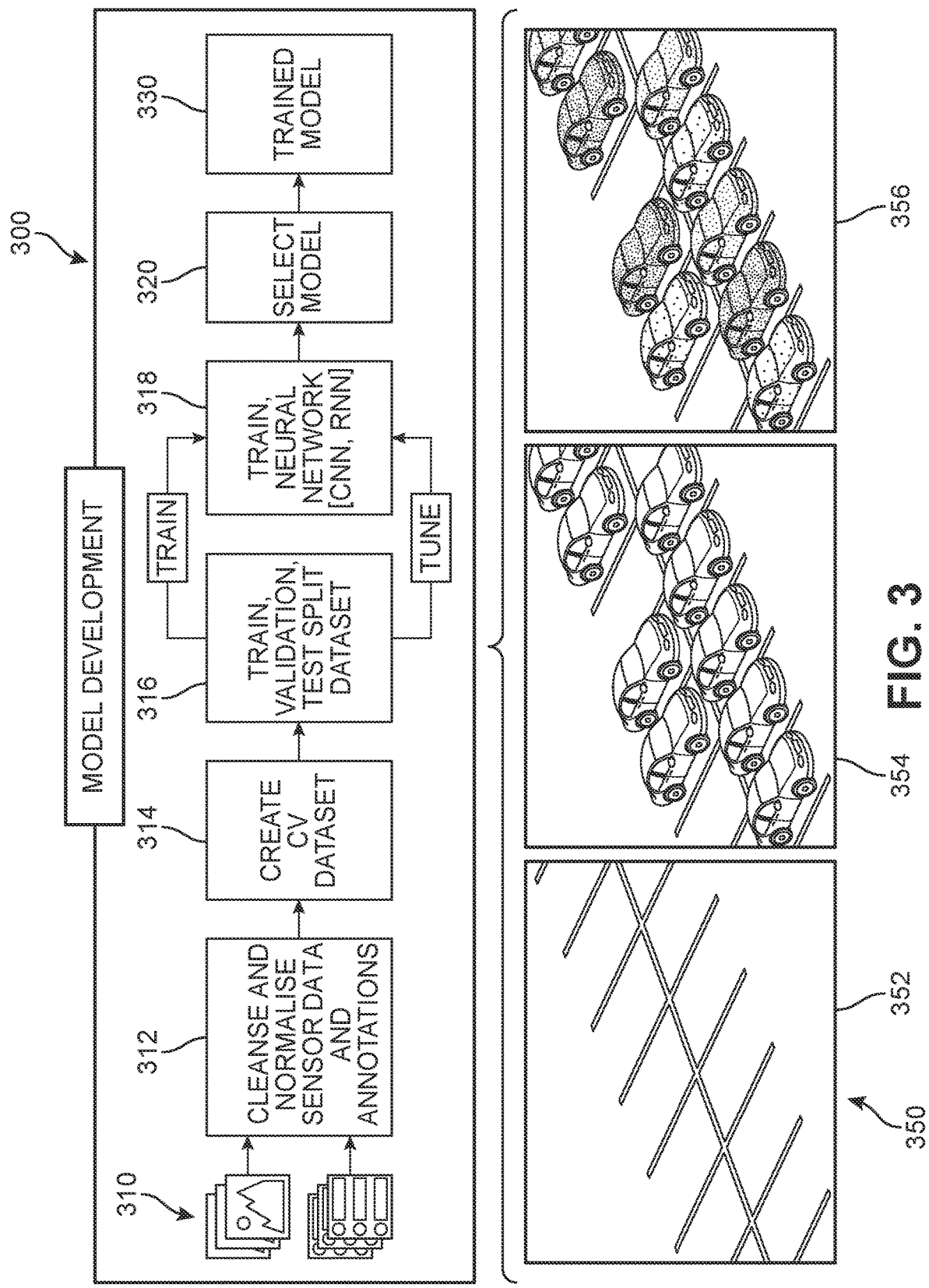
FIG. 3 is a schematic diagram of a process for developing and implementing a model for vehicle damage classification, according to an embodiment.

In different embodiments, the system 210 can include provisions for generating highly accurate estimates of vehicle damage and repair costs. In FIG. 3, one embodiment of a flow process 300 for development and implementation of a machine learning model for detection of vehicle damage in sensor data is shown. The flow process 300 generally represents a model development phase. During the model development, input 310 in the form of imagery and associated annotations is provided to the system. As shown in FIG. 3, in some embodiments, the input 310 includes training image data 350 that is directed to the patterns and/or scenarios where large-scale vehicle damage would most commonly occur. For example, training image data 350 includes a first image 352 representing a parking lot without vehicles (empty parking lot), and a second image 354 of the same parking lot now with vehicles parked (full or partially full parking lot, vehicles undamaged). The first image 352 and second image 354 can be used to train the model to recognize the difference between places with vehicles/no vehicles. In addition, a third image 356 shows vehicles in the parking lot again, but this time some or all of the vehicles have been exposed to hail damage (full or partially full parking lot, vehicles damaged). The second image 354 and the third image 356 can be used to train the model to recognize the difference between vehicles with hail damage and those without hail damage. In some cases, other computer vision techniques (see FIG. 2) could be used to cluster or isolate groups of vehicles within a parking lot to remove irrelevant data (empty spaces, etc.). The images would each be associated with annotations that would teach the model how to recognize or identify various relevant features (vehicles, dents, parking spaces, vehicle components, etc.) as well as the degree of damage, as described earlier.

In one example, the input 310 can then be cleansed and normalized in a first step 312 and a CV dataset is created based on this data in a second step 314. A cycle comprising a third step 316 in which the model is trained, validated, and a split dataset tested followed by a fourth step 318 in which the selected neural network (e.g., CNN, RNN, etc.) is trained and tuned based on the output of third step 316 then occurs. More specifically, machine learning techniques, such as deep learning that includes classification, clustering, and/or other techniques, are applied to the CV dataset to develop the model(s). Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different types of damage. Some suitable artificial intelligence software is available for public access through open source AI platforms like Caffe, Torch and Theano who provide businesses access to powerful neural networks for processing of their information by AI techniques like deep learning, reinforcement learning and logistic regression, as well as TensorFlow, OpenAI, and BigSur. All of these AI systems process enormous amounts of data; for example, Caffe can process over 60 million images per day with a single NVIDIA K40 GPU.

Moreover, in some implementations, the process may employ an estimation engine that uses ML techniques to generate repair cost or damage level estimate information. In some embodiments, such techniques may include supervised and/or unsupervised ML techniques. In some implementations, the estimation engine may employ a ML-based model that is trained using training data that includes prior cost estimates and actual cost information. Accordingly, the estimation engine may be trained over time to develop a more accurate cost estimate based on the previous divergence between estimates and actual cost. Once a model is selected in a fifth step 320, the trained model is adjusted to fit the intended deployment environment in a sixth step 322, and the resulting trained model 330 is prepared for model implementation.

Figure 4:
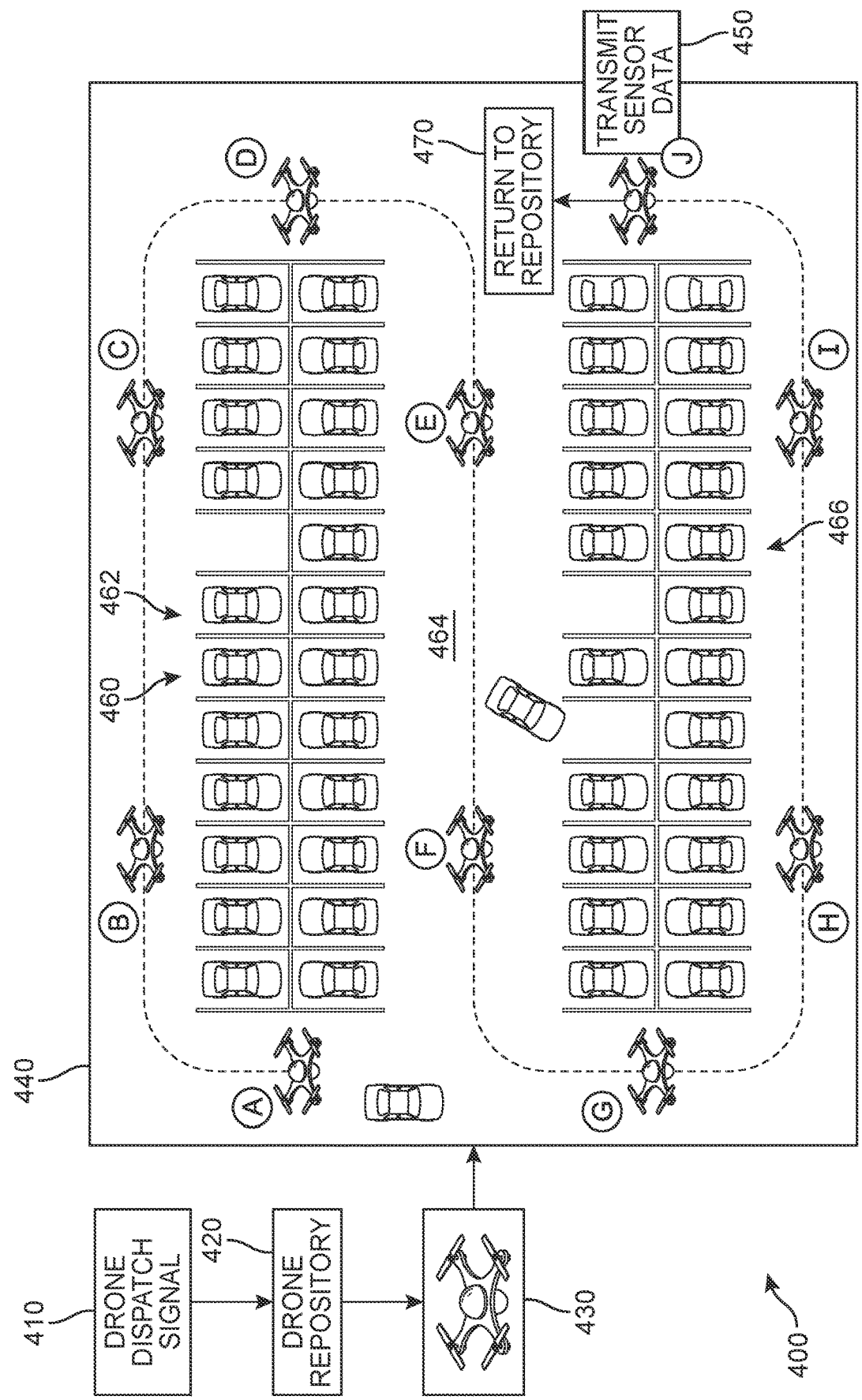
FIG. 4 is a high-level illustration of a process of capturing aerial image and other sensor data for use by the damage assessment system, according to an embodiment.

Referring now to FIG. 4, an example of a data collection event 400 performed by a drone 430 is depicted. In this scenario, the system 210 of FIG. 2 has transmitted a request for sensor data (drone dispatch signal 410) to the drone repository 220. In response, the drone repository 420 deploys an aerial vehicle—in this case, drone 430—to a first target site 440 as identified in the system's request. As used herein, the term "aerial vehicle" refers to any kind of plane, helicopter, drone, or other flying vehicle. While in some cases the aerial vehicle can refer to a plane operated by a pilot, as a general matter, the aerial vehicle used by the proposed embodiments can be remotely operated or programmed.

Furthermore, the aerial vehicle can be understood to include at least one camera for capturing images, where the camera is configured to rotate or reorient its lens to capture images at different angles. This feature permits imagery capture to occur at varying angles in order to collect sufficient sensor data for the damage assessment system model. In some embodiments, the imagery can be obtained using both vertical imagery (nadir, 90 degrees) and oblique (45 degrees) imagery techniques. In general, vertical imagery offers an approximately straight-down aerial view of properties and locations, providing keen insight into car rooftops and property surroundings, and at-a-glance situational awareness of large-scale catastrophe scenarios such as citywide flooding. In contrast, oblique imagery provides an approximately 45° perspective of properties and locations from all four cardinal directions, allowing viewers to see and measure not only the top of objects but the sides as well (e.g., the doors and wheels of a vehicle). The two types of image techniques can be used to collect multiple images of the same area.

In different embodiments, the aerial vehicle may also include or be in communication with additional systems to facilitate capturing, processing, and transmitting image information about one or more areas. The aerial system may also include provisions to determine precise locations for captured images, as well as for performing image processing. The onboard computing system for the aerial vehicle may comprise various systems and components that are disposed within an aerial vehicle. As noted above, the aerial system may include one or more cameras for capturing images and information about a vehicle's structure. The camera may comprise any kind of camera, including any kind of digital camera and/or range imaging camera. Range imaging cameras include any type of device that can capture range information or range images corresponding to an object in the viewing area of the camera. As used herein, "range images" provide a 2D array of values indicating a depth (or distance measurement). Some exemplary range imaging devices may include structured-light 3D scanners and time-of-flight cameras. Using a time-of-flight camera, the system can capture range images of a scene that can be used to build a 3D model of objects in the scene.

The aerial system can also include a GPS receiver for receiving GPS information that can be used to determine a GPS location for the aerial vehicle. In some embodiments, the aerial system may also include sensors for measuring orientation, altitude, and/or acceleration. For example, an aerial system can include a gyroscope, an altimeter, and an accelerometer. In some embodiments, the aerial system can include an altitude and heading reference system (AHRS). Using these devices, the orientation, heading, and height of the aerial vehicle (and of camera(s)) can be determined. This information, when used with a GPS location for the aerial vehicle, can be used to infer the location of one or more points in an image taken from the aerial vehicle as described in further detail below.

In different embodiments, aerial system can also include an image capture and processing system, also referred to simply as processing system. A processing system may be used to store, process, and transmit image information. Additionally, in some cases, a processing system can receive GPS or other coordinate information about one or more target locations. To facilitate these tasks, image capture and processing systems may include one or more processors as well as memory. Memory can store instructions for programs that facilitate storing, processing, and transmitting image information.

Generally, the ground system for the drone repository comprises a computing system that can include, for example, a computer and a database. The computer may further include one or more processors and memory. The computer could be any kind of computer such as a desktop computer, a laptop computer, a server, or any other kind of computer with sufficient computing resources for performing tasks such as image classification. In some embodiments, the ground system can refer to a plurality of interconnected computing devices and/or cloud service repositories configured to connect over a network. Additionally, models or other information could be stored in a separate model database of the computing system.

In this case, the first target site 440 includes or corresponds to a large parking lot 460, shown for purposes of simplicity as comprising to parking islands (a first parking island 462 and a second parking island 466) separated or spaced apart by a driving lane 464. Each parking island has two rows of vehicles. Prior to deployment, the drone repository system has received information about the layout of the first target site 440 from the damage assessment system or directly from the GIS provider (see FIG. 2), which is used by the drone navigation system to generate an aerial path that will ensure a flyover of the entire parking lot (capturing at least a top-down view or bird's-eye view of each parking space).

Although the drone's path can vary widely, particularly as parking lots can differ in size and configuration, for purposes of example, navigation by the drone 430 is represented in FIG. 4 as a reverse "S" path. In this case, the drone 430 is shown traveling first above the first parking island 462 (depicted by stops "A" to "B" to "C" to "D"), then moving back toward its initial starting point by traveling along a center of the driving lane 464 (depicted by stops "D" to "E" to "F" to "G"). Finally, drone 430 moves in the opposite direction again to travel above the second parking island 464 (depicted by stops "G" to "H" to "I" to "J"), when it can make a return trip 470 to the drone repository. While in some embodiments the route can bypass the path over the driving lane 464, it can be appreciated that such additional image capture can represent a more thorough image record of the entire target site, which may include vehicles that were not properly parked in a space but instead were positioned more irregularly. During the flyover, the drone 430 captures images of the vehicles and spaces below in a substantially continuous sequence of shots. These images can be transmitted 450 over a network to the damage assessment system in real-time or near-real time, or can first be stored locally and transferred to the computing system for the drone repository before being shared with the damage assessment system. In other embodiments, there may be additional (secondary) drones deployed with different sensors to collect other image data formats (thermal, infrared, etc.).

Figure 5:
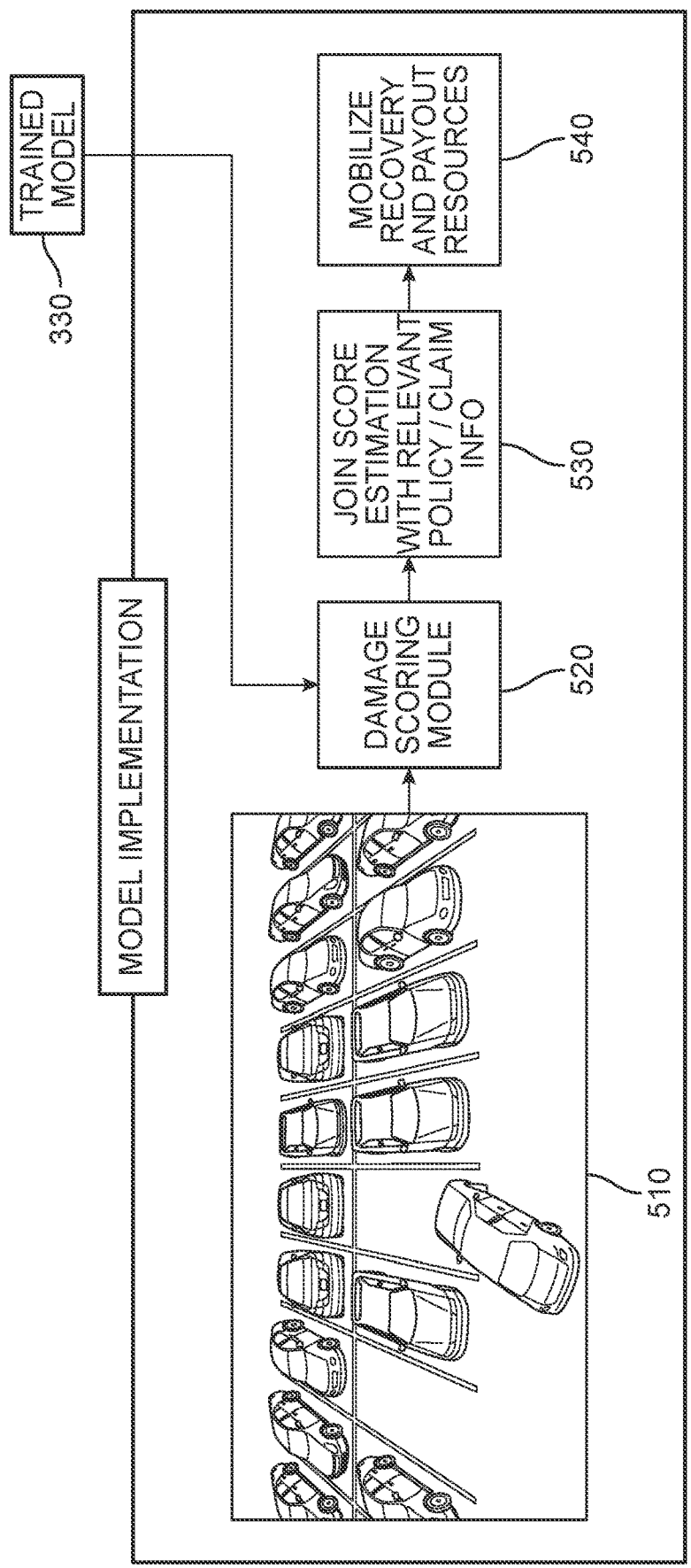
FIG. 5 is a schematic diagram of a process for implementation of the vehicle damage classification process, according to an embodiment.

Once the damage assessment system receives the requested data, the data can be passed to the trained model 330 generated and selected in FIG. 3. Moving to FIG. 5, aerial images 510 and/or other sensor data captured by the drone are now inputted into a damage scoring module 520 that implements the trained model 330 and computer vision techniques. In some optional embodiments, the output of the model for each individual vehicle can be associated or linked with the member for whom it was insured (policy link stage 530). Finally, the system can generate a recommendation 540 that will be used to mobilize a recovery effort and/or facilitate the processing of payout or other resources to the members of the target area impacted.

Figure 6:
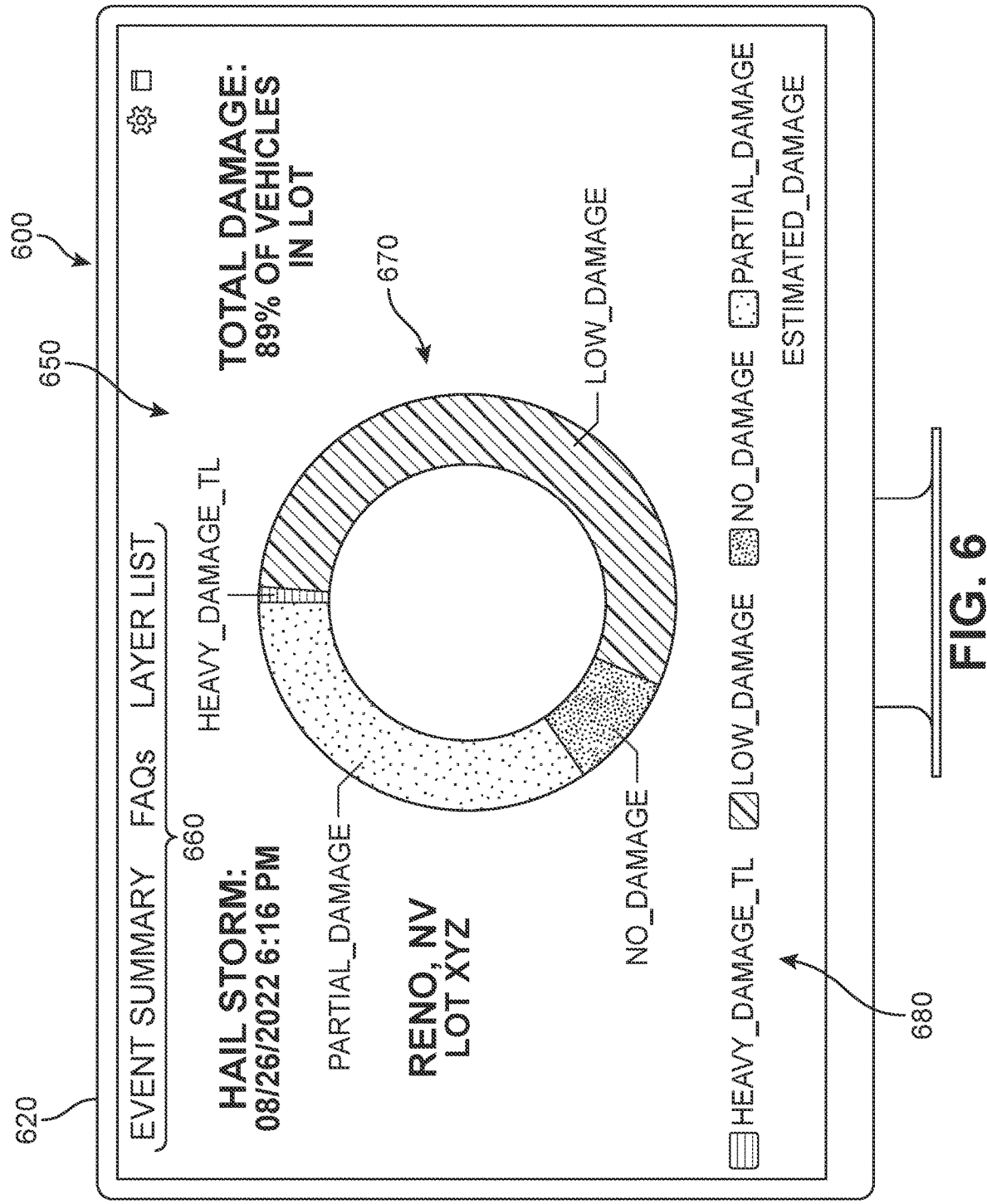
FIG. 6 is an example of a user interface for viewing details of damage as determined by the damage assessment system, according to an embodiment.

For purposes of illustration, FIG. 6 depicts an example of a user interface dashboard ("dashboard") 650 that can provide an end-user with a variety of interactive tools to monitor and manage the damage data. As one non-limiting example, an event summary page 600 for the dashboard 650 is presented via a computing device display 620. The event summary page 600 can be provided to end-users to quickly convey information and observations about a group of vehicles in the region. For example, the event summary page 600 includes an analytics overview for the target region, and includes an interactive header region 160 including a plurality of viewing options (e.g., "Event Summary", "FAQs", "Layer List", etc.) and a metrics summary 670 with a legend 680 which can present a pictorial summary of various aspects of the processed data. In other embodiments, the user interface can present various metrics and reports for individual vehicles as well as for larger groups of vehicles in a region. In some embodiments, some or all of these reports can be presented in graphical form, such as bar graphs, line graphs, pie charts, cartesian graphs, percent complete indicators, etc. In this case, a pie chart represents the damage detected in a parking lot where each vehicle has suffered different degrees of damage. The pie chart shows the proportion of damage present in the parking lot. For example, a rating of "Heavy Damage", "Partial Damage", "Low Damage", and "No Damage" is used in FIG. 6. In other embodiments, other scales may be used, including numerical values, color coding, etc. This type of data collection, analysis, and visualization can provide essential information to insurers and expedite the processing of claims and follow-ups for insured members. In different embodiments, these interfaces are presented in conjunction with the collected aerial imagery or other sensor data for the target area.

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons, holographic interactions or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video, or other such information presentation.

It should be understood that the dashboard 650 of FIG. 6 represents only one possible depiction of a user interface that may be offered to the end-user, and in other embodiments, any variation in presentation style, options, menus, and graphical depictions can be used, including interfaces customized by the end-user to display the desired information. A Settings option can also be displayed to allow the end-user to create or modify the information shown. In addition, a number of interface layer options may be provided. For example, other options can allow the user to switch to a landing page that presents a brief summary of a member's account or a log of the user's previous activity.

Figure 7A:
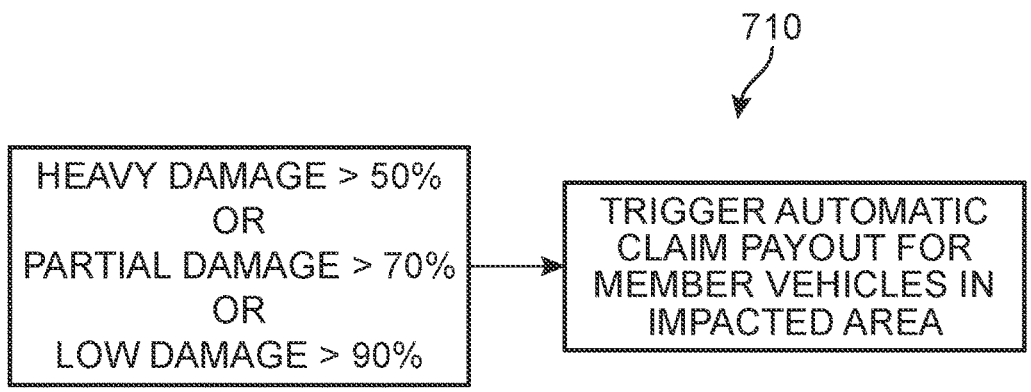
FIGS. 7A, 7B, and 7C are flow diagrams showing examples of damage reports causing pre-established resource mobilization responses, according to an embodiment.
Figure 7B:
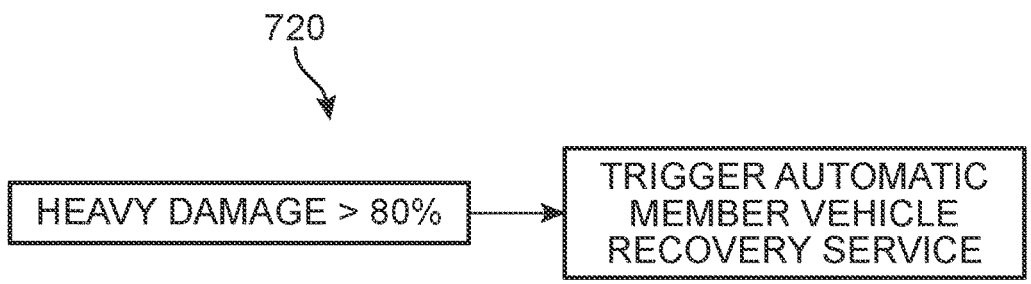
Figure 7C:
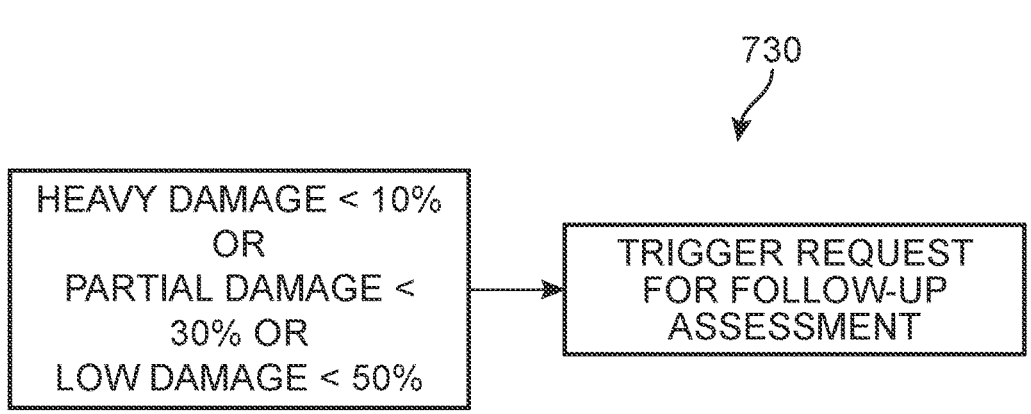

Simply for purposes of illustration, some examples of automatic operations that may be triggered in response to the system's damage assessment are shown in FIGS. 7A, 7B, and 7C. In these three diagrams, possible responses are selected based on a set of conditions that have been established by the system administrator or other entity. For example, in FIG. 7A, a first process 710 is presented in which a set of conditions ("Heavy Damage>50% OR Partial Damage>70% OR Low Damage>90%"), if met, will lead to an automatic approval of any claims and/or an automatic payout (transfer of funds) of said claims that are received by members on behalf of vehicles that were in the impacted (target) area. In some cases, the payout can be an automated partial payout of what is due to the member, pending formal completion and processing of the claim, or pending formalization of the appraisal and adjuster adjudication. In another example, the system can generate an automated provisioning request for a rental vehicle for those members with rental coverage upon determination that there is a high likelihood of damage sufficient to render their vehicle undriveable. In some embodiments, the system can provide mobility services such as Lyft® or Uber® rather than a rental car.

In FIG. 7B, another pre-established condition ("Heavy Damage>80%") can be seen to cause an automatic vehicle recovery service operation to be approved and/or deployed to the location of the vehicle. In addition, in FIG. 7C, the set of conditions ("Heavy Damage<10% OR Partial Damage<30% OR Low Damage<50%"), if met, will lead to an automatic requirement for a follow-up assessment of the damage, possibly by an in-person (on the ground) visit, before any other action is permitted.

Figure 8:
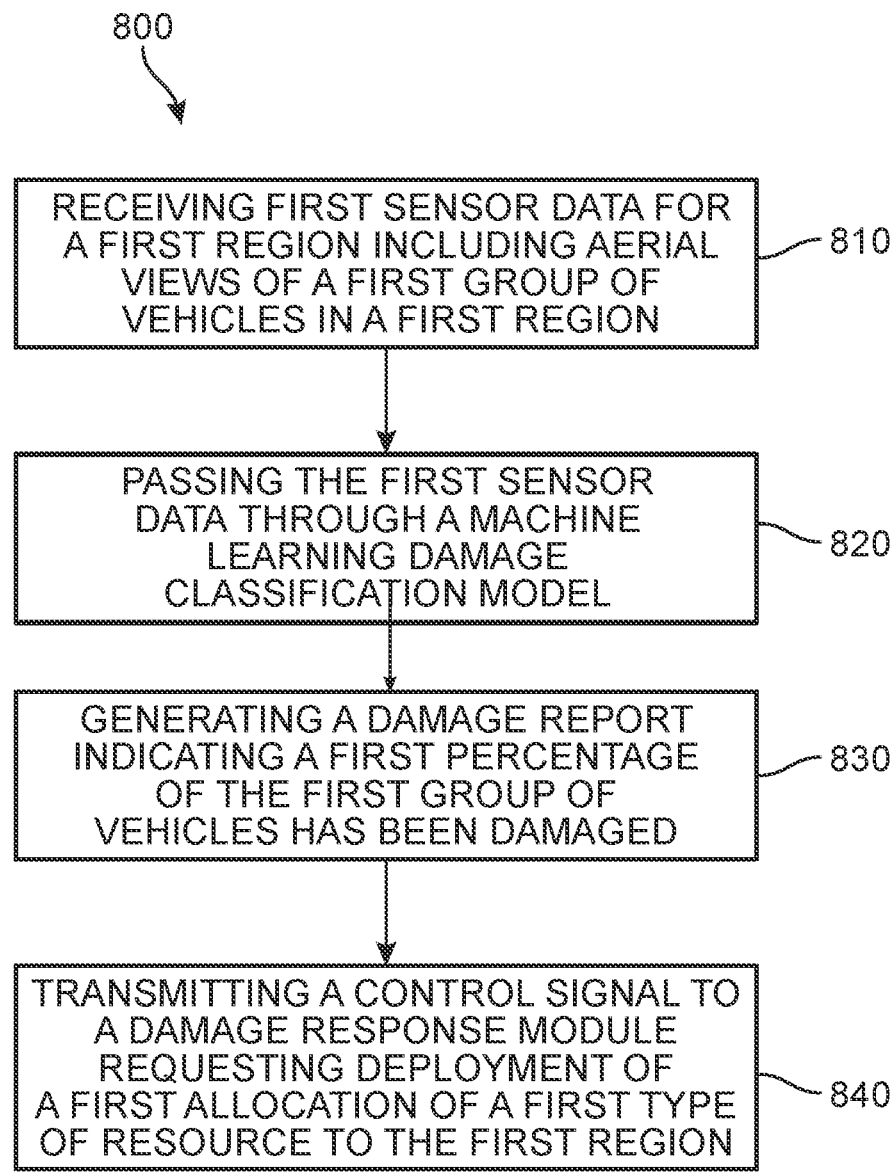
FIG. 8 is a flow chart depicting a process of mobilizing resources for disaster-impacted areas based on aerial imagery, according to an embodiment.

FIG. 8 is a flow chart illustrating an embodiment of a method 800 of mobilizing resources for disaster-impacted areas (e.g., based on aerial drone sensor data). A first step 810 includes receiving at a first time, at a damage assessment system, first sensor data for a first region, the first sensor data including aerial views of a first group of vehicles, and a second step 820 includes passing the first sensor data through a machine learning damage classification model of the damage assessment system. A third step 830 includes automatically generating, at the damage classification model and based on the first sensor data, a damage report indicating a first percentage of the first group of vehicles has been damaged, and a fourth step 840 includes automatically transmitting, from the damage assessment system and based on (in response to) the damage report, a control signal to a damage response module requesting deployment of a first allocation of a first type of resource to the first region.

In other embodiments, the method may include additional steps or aspects. In one embodiment, the method also includes steps of receiving, prior to the first time and at the damage assessment system, a first data indicating a disaster has occurred in the first region, determining, at the damage assessment system, that the first data corresponds to a triggering event, and transmitting, from the damage assessment system and to a drone repository, a request for the first sensor data to be captured. In some embodiments, the first sensor data is captured during an aerial flyover of the first region by one or more drones dispatched from the drone repository. In one example, the first sensor data is received directly from the one or more drones during the aerial flyover.

In another embodiment, the method can also include steps of receiving, prior to the first time and at the damage assessment system, a first data indicating a disaster has occurred in the first region, determining, at the damage assessment system, that the first data corresponds to a triggering event, and transmitting, from the damage assessment system and to an aerial sensor database, a request for the first sensor data to be shared with the damage assessment system. In one embodiment, the first region includes a parking lot where the first group of vehicles are parked. In another example, the first sensor data includes images providing top-down views of the first group of vehicles.

In some embodiments, the first group of vehicles includes a first vehicle. In such cases, the method can also include steps of receiving, prior to the first time and at the damage assessment system, a first insurance claim for damage to the first vehicle, determining, at the damage assessment system, that the first claim corresponds to a triggering event, and transmitting from the damage assessment system, to one of a drone repository and an aerial image database, a request for the first sensor data. In some examples, the method can further include a step of determining, at the damage assessment system the first vehicle is associated with a first damage level, where the first type of resource includes approval or generation of an automatic payout of the first insurance claim. In some embodiments, the first type of resource includes one of a payout of insurance claims submitted on behalf of one or more vehicles in the group of vehicles (e.g., automatic triggering of a direct deposit of funds to the insured members impacted by the disaster) and an automated dispatch of recovery operations (e.g., large vehicles to tow the damaged vehicle(s) to a repair station or dump, clean-up crews to facilitate the clearing of the damage and debris, etc.).

Other methods may be contemplated within the scope of the present disclosure. For example, in some embodiments, a second method of mobilizing resources for disaster-impacted areas (e.g., in response to aerial imagery) is disclosed. The method can include a first step of receiving at a first time, at a damage assessment system, first sensor data for a first region, the first sensor data including aerial views of a first group of vehicles, the first group of vehicles including a first vehicle, and a second step of receiving, prior to the first time and at the damage assessment system, a first insurance claim for damage to the first vehicle. In addition, the method can include a third step of passing the first sensor data through a machine learning damage classification model of the damage assessment system, and a fourth step of generating, at the damage classification model and based on the first sensor data, a damage report indicating the first vehicle is associated with a first damage score. Furthermore, the method can include a fifth step of transmitting, from the damage assessment system and based on (in response to) the damage report, a control signal to a damage response module that causes a first payout to be generated in response to the first insurance claim.

In other embodiments, this method may include additional steps or aspects. In one embodiment, the first sensor data includes an image providing a top-down view of the first vehicle. In another example, the first insurance claim includes information describing a current location of the first vehicle, and the information is used to identify the first vehicle in the first sensor data.

As described herein, the proposed systems and methods offer significant advantages to damage assessment paradigms. Conventional approaches are limited to crude classifications such as "damaged, "partially damaged", or "not damaged" for the building as a whole, making estimations of rebuilding costs difficult and/or unreliable. In contrast, the proposed system is designed to automatically assign different degrees of damage across different portions of the building, allowing for more accurate estimates of the damage. For example, deep learning models are employed to identify condition concerns on the property, estimate rebuild costs, and other property attributes for each specific home with improved accuracy and specificity, unlike traditional probabilistic models that use features associated with such properties. These prediction accuracies have been observed to greater than 98%. Furthermore, while conventional approaches are limited to the detection of external damage based on nadir imagery, the proposed systems are configured to use information from both nadir and oblique views to infer damage to internal structures. In addition, while conventional approaches estimate repair costs using simple models that do not account for the specific dimensions of a building or structure, the proposed system constructs 3D models from aerial imagery that can be used to provide more accurate estimates of the spatial extent of the damage. Such 3D models can also be used to permit end-user to perform virtual inspections and damage reviews in lieu of ordering a costly physical inspection, facilitating large scale damage assessments for each member in the catastrophe zone. Furthermore, the proposed system is readily scalable, and the code base for data acquisition, processing, and UI presentation has been shown to provide robust, reliable results.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of mobilizing resources for disaster-impacted areas using one or more aerial drones, the method comprising:
    sending a drone dispatch signal to the one or more aerial drones, the drone dispatch signal causing the one or more aerial drones to deploy to a first region;
    each of the one or more aerial drones including (1) an altitude and heading reference system that generates orientation and altitude data describing a position of the respective aerial drone, (2) a GPS receiver that generates GPS location data describing a position of the respective aerial drone, and (3) an image capture and processing system that generates image data;
    receiving at a first time, at a damage assessment system, first sensor data for the first region, the first sensor data including image data of aerial views of a first group of vehicles;
    the first sensor data being received from the one or more aerial drones, and the first sensor data further including the orientation and altitude data, and the GPS location data generated by the aerial drone;

passing the first sensor data through a machine learning damage classification model of the damage assessment system;

generating, with the machine learning damage classification model and based on the first sensor data that includes each of the image data, the orientation and altitude data, and the GPS location data, a damage report indicating a first percentage of the first group of vehicles that has been damaged; and transmitting, from the damage assessment system and based on the damage report, a control signal to a damage response module requesting deployment of a first allocation of a first type of resource to the first region.

2. The method of claim 1, further comprising:

receiving, prior to the first time and at the damage assessment system, a first data indicating a disaster has occurred in the first region;

determining, at the damage assessment system, that the first data corresponds to a triggering event; and transmitting, from the damage assessment system and to a drone repository, a request for the first sensor data to be captured.

3. The method of claim 2, wherein the method further comprises receiving layout data describing the first region, and the drone dispatch signal includes an aerial path of the one or more drones that ensures that the one or more drones will fly over an entirety of the first region based on the layout data.

4. The method of claim 3, wherein the machine learning damage classification model is trained on training image data that includes (1) images of empty parking lots, (2) images of parking lots with vehicles without damage, and (3) images of parking lots with vehicles having damage, in order to identify vehicles having damage in the first sensor data.

5. The method of claim 1, further comprising:

receiving, prior to the first time and at the damage assessment system, a first data indicating a disaster has occurred in the first region;

determining, at the damage assessment system, that the first data corresponds to a triggering event; and transmitting, from the damage assessment system and to an aerial image database, a request for the first sensor data to be shared with the damage assessment system.

6. The method of claim 1, wherein the first region includes a parking lot where the first group of vehicles are parked.

7. The method of claim 1, wherein the first sensor data includes images providing top-down views of the first group of vehicles.

8. The method of claim 1, wherein the first group of vehicles includes a first vehicle, and the method further comprises:

receiving, prior to the first time and at the damage assessment system, a first insurance claim for damage to the first vehicle;

determining, at the damage assessment system, that the first claim corresponds to a triggering event; and transmitting from the damage assessment system, to one of a drone repository and an aerial image database, a request for the first sensor data.

9. The method of claim 8, further comprising determining, at the damage assessment system the first vehicle is associated with a first damage level, wherein the first type of resource includes an automatic partial payout of the first insurance claim.

10. The method of claim 1, wherein the first type of resource includes one of an automated partial payout of insurance claims submitted on behalf of one or more vehicles in the group of vehicles and provisioning of a rental car for an insured member associated with a vehicle in the group of vehicles.

11. A method of mobilizing resources for disaster-impacted areas using one or more aerial drones, the method comprising:

sending a drone dispatch signal to the one or more aerial drones, the drone dispatch signal causing the one or more aerial drones to deploy to a first region;

each of the one or more aerial drones including (1) an altitude and heading reference system that generates orientation and altitude data describing a position of the respective aerial drone, (2) a GPS receiver that generates GPS location data describing a position of the respective aerial drone, and (3) an image capture and processing system that generates image data;

receiving at a first time, at a damage assessment system, first sensor data for the first region, the first sensor data including image data of aerial views of a first group of vehicles, the first group of vehicles including a first vehicle;

the first sensor data being received from the one or more aerial drones, and the first sensor data further including the orientation and altitude data, and the GPS location data generated by the aerial drone;

receiving, prior to the first time and at the damage assessment system, a first insurance claim for damage to the first vehicle;

passing the first sensor data through a machine learning damage classification model of the damage assessment system;

generating, with the machine learning damage classification model and based on the first sensor data that includes each of the image data, the orientation and altitude data, and the GPS location data, a damage report indicating the first vehicle is associated with a first damage score; and transmitting, from the damage assessment system and based on the damage report, a control signal to a damage response module that causes an automated first partial payout to be generated in response to the first insurance claim.

12. The method of claim 11, wherein the machine learning damage classification model is trained on training image data that includes (1) images of empty parking lots, (2) images of parking lots with vehicles without damage, and (3) images of parking lots with vehicles having damage, in order to identify vehicles having damage in the first sensor data.

13. The method of claim 11, wherein the first insurance claim includes information describing a current location of the first vehicle, and the information is used to identify the first vehicle in the first sensor data.

14. A system for mobilizing resources for disaster-impacted areas, the system comprising a processor and machine-readable media including instructions which, when executed by the processor, cause the processor to:

send a drone dispatch signal to the one or more aerial drones, the drone dispatch signal causing the one or more aerial drones to deploy to a first region;

each of the one or more aerial drones including (1) an altitude and heading reference system that generates orientation and altitude data describing a position of the respective aerial drone, (2) a GPS receiver that generates GPS location data describing a position of the respective aerial drone, and (3) an image capture and processing system that generates image data;

receive at a first time, at a damage assessment system, a first sensor data for the first region, the first sensor data including image data of aerial views of a first group of vehicles;

the first sensor data being received from the one or more aerial drones, and the first sensor data further including the orientation and altitude data, and the GPS location data generated by the aerial drone;

pass the first sensor data through a machine learning damage classification model of the damage assessment system;

generate, with the machine learning damage classification model and based on the first sensor data that includes each of the image data, the orientation and altitude data, and the GPS location data, a damage report indicating a first percentage of the first group of vehicles that has been damaged; and transmit, from the damage assessment system and based on the damage report, a control signal to a damage response module requesting deployment of a first allocation of a first type of resource to the first region.

15. The system of claim 14, wherein the instructions further cause the processor to:
receive, prior to the first time and at the damage assessment system, a first data indicating a disaster has occurred in the first region;
determine, at the damage assessment system, that the first data corresponds to a triggering event; and
transmit, from the damage assessment system and to a drone repository, a request for the first sensor data to be captured.

16. The system of claim 14, wherein the instructions further cause the processor to:
receive, prior to the first time and at the damage assessment system, a first data indicating a disaster has occurred in the first region;
determine, at the damage assessment system, that the first data corresponds to a triggering event; and
transmit, from the damage assessment system and to an aerial image database, a request for the first sensor data to be shared with the damage assessment system.

17. The system of claim 14, wherein the machine learning damage classification model is trained on training image data that includes (1) images of empty parking lots, (2) images of parking lots with vehicles without damage, and (3) images of parking lots with vehicles having damage, in order to identify vehicles having damage in the first sensor data.

18. The system of claim 14, wherein the first group of vehicles includes a first vehicle, and the instructions further cause the processor to:
receive, prior to the first time and at the damage assessment system, a first insurance claim for damage to the first vehicle;
determine, at the damage assessment system, that the first claim corresponds to a triggering event; and
transmit from the damage assessment system, to one of a drone repository and an aerial image database, a request for the first sensor data.

19. The system of claim 18, wherein the instructions further cause the processor to determine, at the damage assessment system the first vehicle is associated with a first damage level, wherein the first type of resource includes an automatic partial payout of the first insurance claim.

20. The system of claim 14, wherein the first type of resource includes one of a automated partial payout of insurance claims submitted on behalf of one or more vehicles in the group of vehicles and provisioning of a rental car for an insured member associated with a vehicle in the group of vehicles.

* * * * *